Patented Nov. 3, 1936

2,059,828

UNITED STATES PATENT OFFICE 2,059,828

FRUIT BEVERAGE AND METHOD OF PREPARING THE SAME

Guy Verley, Chicago, Ill., assignor to Albert Verley, Inc., Chicago, Ill., a corporation of Illinois No Drawing. Application March 9, 1936, Serial No. 67,935

6 Claims. (Cl. 99—155)

This invention relates to improvements in fruit beverages and method of preparing the same.

It is well known that beverages prepared only from the juice of the pulp or body of citrus fruits, such as oranges or lemons, are lacking in desirable flavor, and that beverages prepared from the fruit juice containing fruit acid and water, and from the essential oils and other aroma and flavoring principles of the rind, will in a relatively short time deteriorate or turn rancid due to the reaction of the fruit acid and water with certain constituents of the rind, thus in time altering the natural color and also impairing or destroying its value for beverage purposes.

To overcome this difficulty especially where the beverage must frequently be stored for varying periods before consumption, it is the practice in some instances first to remove the rind or peel from the fruit and then prepare two separate syrups, one from the rind containing the essential oils and other flavoring principles, and one from the juice and pulp which contains the fruit acid and water. These syrups are stored in separate containers and are mixed in the desired proportions and quantities only shortly before sale to the consumer.

This method of preparing and storing the beverage syrups to improve their keeping qualities necessitates the paring of the fruit, the use of additional containers for the two syrups, and introduces certain other obvious inconveniences in the marketing of the product.

One object of the present invention is to provide a fruit beverage or beverage concentrate which notwithstanding the fact that it contains fruit oils, acids and water, may be stored for substantial periods without impairment of taste, aroma or color.

Another object of the invention relates to the provision of a method of preparing the beverage, or beverage concentrate.

In preparing the improved beverage or the concentrate from which the beverage may later be prepared by the addition of water or water and sugar, the citrus fruit, such as oranges, for example, is passed through mills which crush or grind the whole fruit and express the juices from the pulp and the oils and other flavoring and aroma producing agents from the rind. The resulting liquid is then centrifuged by well known means to separate the products of the pulp including the fruit water and acids from the fruit oils. The centrifuged liquids are then evaporated down to any suitable concentration where a beverage concentrate is to be prepared.

I have found that citral, which is present in the oil of citrus fruit rind, is the, or the most potent, constituent of the oil which causes deterioration of the beverage by reaction with the fruit acids and hence after the oils have been separated from the liquid as above stated, I remove the citral by any suitable method, as for example in the following manner:

A solution of sodium sulphite and distilled water is prepared in the proportions of 12 oz. of the former to 10 lbs. of the latter and cooled to about 5° C. To this solution is added, with vigorous stirring, approximately 5 pounds of the fruit oils to each 10 pounds of water of the solution and also a small quantity of phenolphthalene solution to serve as an indicator. Neutralization of the caustic soda formed by the re-action of the citral of the oil and the sodium sulphite is effected by the addition of acid until no further change in coloration takes place. The oil is, thereafter, separated from the solution and washed and dried. The sodium sulphite of the above solution may be recovered for further use.

To the citral-free oil a sufficient quantity of a stabilizer is added such as a solution of gum tragacanth or acacia gum, or a pectin solution, to form, when homogenized, a stabilized emulsion. The desired quantity of this stabilized emulsion is then added to the concentrated fruit juice and the concentrate thus formed, being free or substantially free of citral, is placed in suitable containers, preferably pasteurized, and sealed for shipment or storage. This prepared concentrate containing the citral-free oil and fruit acids and other natural constituents of the fruit, has keeping qualities which enable it to be stored indefinitely without danger of deterioration by the development of the bitter, piney or turpentine-like taste characteristic of aged citrus fruit beverage and without the loss of the natural fruit aroma or alteration in the original color.

In instances where the size of the container is not particularly objectionable, as where the beverage is intended for local consumption, the juices of the pulp need not be concentrated but after the liquids have been expressed from the fruit pulp and rinds and the oils have been separated and the citral removed, the citral-free oil may, when emulsified, be returned to the juice to restore to the beverage the natural fruit taste and aroma.

By the present improved method it is not necessary to remove the peel from the fruit, as has been practiced heretofore, and thereafter express the oil from the rind and the juices from the pulp separately, although such method may be followed, if desired, in carrying out the present invention. I have found it most economical, however, in manufacturing the concentrate for commercial purposes, to crush and comminute the entire fruit including the rind, and then by centrifuging to separate the oils and thereafter remove the citral as above described.

In preparing the beverage or beverage concentrate, all, or a large portion of the pulp and rind may be permitted to remain in the liquid in crushed or comminuted form in accordance with common practice. In preparing a beverage from the concentrate it is mixed with a suitable quantity of water and with sugar, if desired, in the usual manner.

While I have described the preferred method of preparing the improved beverage or beverage concentrate, I do not wish to be restricted specifically thereto except as so limited by the appended claims.

I claim:

1. A citrus fruit beverage concentrate of improved keeping-quality comprising the juice of the fruit and citral-free essential oils of the fruit rind.

2. The method of preparing a citrus fruit beverage concentrate of improved keeping-quality which comprises the steps of expressing the juice from the pulp and the essential oils and flavoring principles from the rind, centrifuging the resulting liquid to separate therefrom the essential oils, removing citral from the oils naturally present therein, and thereafter recombining the citral-free oils with juice of the fruit pulp.

3. The method of preparing a citrus fruit beverage which comprises expressing the juices from the pulp and the essential oils from the rind, removing the citral from the expressed oils, and thereafter adding the citral-free oil to the juices of the pulp.

4. The method of preparing a citrus fruit beverage of improved keeping-quality which comprises expressing the juices from the pulp and the essential oils from the rind, separating the oils from the resulting fruit liquid, removing the citral from the oils, and thereafter adding the citral-free oils to the fruit liquid.

5. The method of preparing a citrus fruit beverage of improved keeping quality which comprises expressing the juices from the pulp and the essential oils from the rind, separating the oils from the resulting fruit liquid, removing the citral from the oils, forming a stabilized emulsion of the citral-free oils, and thereafter adding the emulsion to the fruit liquid.

6. A citrus fruit beverage of improved keeping-quality comprising the juice of the pulp and a stabilized emulsion containing citral-free oils of the fruit rind.

GUY VERLEY.